US010913882B2

(12) United States Patent
Farid et al.

(10) Patent No.: US 10,913,882 B2
(45) Date of Patent: Feb. 9, 2021

(54) METHOD FOR LOW TEMPERATURE MICROENCAPSULATION OF PHASE CHANGE MATERIALS (71) Applicants: QATAR UNIVERSITY, Doha (QA); THE UNIVERSITY OF AUCKLAND, Auckland (NZ); COLLEGE OF THE NORTH ATLANTIC-QATAR, Doha (QA)

(72) Inventors: Mohammed Farid, Auckland (NZ); Refat Al Shannaq, Doha (QA); Shaheen Al-Muhtaseb, Doha (QA); Jamal Kurdi, Doha (QA)

(73) Assignees: QATAR UNIVERSITY, Doha (QA); COLLEGE OF THE NORTH ATLANTIC-QATAR, Doha (QA); AUCKLAND UNISERVICES LIMITED, Auckland (NZ)

( * ) Notice: Subject to any disclaimer, the term of this patent is extended or adjusted under 35 U.S.C. 154(b) by 128 days.

(21) Appl. No.: 15/748,495

(22) PCT Filed: Aug. 31, 2016

(86) PCT No.: PCT/US2016/049750
§ 371 (c)(1),
(2) Date: Jan. 29, 2018

(87) PCT Pub. No.: WO2017/040699
PCT Pub. Date: Mar. 9, 2017

(65) Prior Publication Data
US 2018/0223146 A1  Aug. 9, 2018

Related U.S. Application Data
(60) Provisional application No. 62/212,554, filed on Aug. 31, 2015.

(51) Int. Cl.
*C09K 5/06* (2006.01)
*B01J 13/14* (2006.01)
(Continued)

(52) U.S. Cl.
CPC ............... *C09K 5/063* (2013.01); *B01J 13/14* (2013.01); *B01J 13/18* (2013.01); *B01J 19/123* (2013.01);
(Continued)

(58) Field of Classification Search
None
See application file for complete search history.

(56) References Cited

U.S. PATENT DOCUMENTS 4,532,183 A   7/1985  Shackle et al.
4,708,812 A  11/1987  Hatfield
(Continued)

FOREIGN PATENT DOCUMENTS

CN   101628218 A    1/2010
EP      2119498 A1  11/2009
WO   2012110443 A1   8/2012

OTHER PUBLICATIONS

Li et al., "Morphology, Structure and Thermal Stability of Microencapsulated Phase Change Material with Copolymer Shell", Energy, 2011, vol. 36, pp. 785-791 (Abstract only).
(Continued)

*Primary Examiner* — Jeffrey D Washville
(74) *Attorney, Agent, or Firm* — Squire Patton Boggs (US) LLP (57) ABSTRACT The method for low temperature microencapsulation of phase change materials or other components includes the following steps: (a) preparing a phase change emulsion including droplets of at least one active phase-change material in water with a surfactant; (b) adding a monomer of at
(Continued)

least one encapsulating agent; (c) introducing the phase change emulsion into a UV reactor while stirring the emulsion; and (d) initiating the photo polymerization of monomers using at least one UV lamp inside the UV reactor for photo polymerization until the phase change material is encapsulated within a polymeric shell to form microcapsules. The microcapsules obtained by this process may have a diameter between about 0.5 to about 2 μm. Other sizes can also be obtained by changing stirring speed of the emulsion.

12 Claims, 9 Drawing Sheets

(51) Int. Cl.
*B01J 13/18* (2006.01)
*C08F 2/22* (2006.01)
*F28D 20/02* (2006.01)
*C08F 2/48* (2006.01)
*B01J 19/12* (2006.01)
*C08F 220/14* (2006.01)

(52) U.S. Cl.
CPC .................. *C08F 2/22* (2013.01); *C08F 2/48* (2013.01); *C08F 220/14* (2013.01); *F28D 20/023* (2013.01); *B01J 2219/0869* (2013.01); *B01J 2219/1203* (2013.01); *Y02E 60/14* (2013.01)

(56) References Cited

U.S. PATENT DOCUMENTS

| | | | |
|---|---|---|---|
| 5,432,210 | A | 7/1995 | Bogan, Jr. |
| 7,919,184 | B2 | 4/2011 | Mohapatra et al. |
| 2002/0050659 | A1* | 5/2002 | Toreki ................. A01N 25/006 264/4.1 |
| 2004/0076826 | A1 | 4/2004 | Lee |
| 2009/0227451 | A1 | 9/2009 | Rose et al. |
| 2010/0016513 | A1 | 1/2010 | Hartmann et al. |
| 2010/0022697 | A1 | 1/2010 | Rodriguez Romero et al. |
| 2011/0008536 | A1 | 1/2011 | Oh |
| 2011/0121246 | A1 | 5/2011 | Biggin |
| 2015/0203733 | A1 | 7/2015 | Zhang et al. |
| 2017/0216162 | A1* | 8/2017 | Feng ...................... A61Q 15/00 |

OTHER PUBLICATIONS

Sanchez et al., "Microencapsulation of PCMs with a Polystyrene Shell", Colloid Polym. Sci., 2007, vol. 285, Iss. 12, pp. 1377-1385.
Sude Ma et al., "UV irradiation-initiated MMA polymerization to prepare microcapsules containing phase change paraffin," Solar Energy Materials & Solar cells, 94, pp. 1643-1647 (2010).
International Search Report and Written Opinion issued in corresponding International Patent Application No. PCT/US2016/049750 dated Dec. 8, 2016.
Extended European Search Report issued in corresponding European Patent Application No. 20175381.1-1101 dated Sep. 21, 2020.

* cited by examiner

METHOD FOR LOW TEMPERATURE MICROENCAPSULATION OF PHASE CHANGE MATERIALS

TECHNICAL FIELD

The present invention relates to phase change materials (PCMs), and particularly to a method for low temperature microencapsulation of phase change materials that utilizes ultraviolet (UV) photoinitialization in a thin film closed loop UV reactor.

BACKGROUND ART

Phase change materials (PCMs) are materials that melt and solidify at a nearly constant temperature, and are capable of storing and releasing large amounts of energy when they undergo phase change. Heat is absorbed or released when the material changes between the solid and liquid phases at a certain temperature (the phase change temperature) and vice versa.

There are several applications where PCMs have been used for thermal energy storage, such as heating and cooling of water, smart textiles, biomaterials and biomedical applications, electronics, automotive industry, space applications, food industry and building construction. The challenge with PCMs, especially with PCMs undergoing phase change at ambient temperature, such as those used in buildings, is in containing them in an appropriate matrix. This is because organic PCMs have a tendency to leak or exude to the surface of the matrices in which they are contained during the phase change process. This leads to the surface becoming oily and stained and to degradation of the thermal storage properties of the PCM. Encapsulation of phase change materials (PCMs) in micro-size vesicles can overcome these problems.

Various physical and chemical methods have been used for the production of microcapsules. However, conventional methods for microencapsulating PCMs generally require high temperatures.

Thus, a method for low temperature microencapsulation of phase change materials solving the aforementioned problems is desired.

DISCLOSURE OF INVENTION

The method for low temperature microencapsulation of phase change materials includes the following steps: (a) preparing a phase change emulsion including droplets of at least one active phase change material in water with a surfactant; (b) adding a monomer of at least one encapsulating agent; (c) introducing the phase change emulsion a thin film closed loop ultraviolet (UV) reactor while stirring the emulsion; and (d) initiating the photo polymerization of monomers using at least one UV lamp inside the UV reactor for photo polymerization until the phase change material is encapsulated within a polymeric shell to form microcapsules.

A UV polymerization reactor for microencapsulation of phase change material may include a collection tank surrounded with a cooling jacket and including a mechanical stirrer and a thermocouple to receive a phase change material emulsion; a magnetic pump for recirculating the emulsion from the tank to a flow distributor; a plurality of UV lamps for providing UV light for initiating of polymerization positioned above a flat, inclined glass plate; a nitrogen supply unit connected to the reactor and supplying a nitrogen to create an inert atmosphere and to deoxygenate the phase change material emulsion; and a cooling unit to cool the collection tank during the polymerization. The phase change material emulsion is circulated from the tank to the flow distributor over the flat, inclined plate and back into the tank by the magnetic pump. Other forms of closed-loop, thin-film reactor configurations can also be used.

The phase change material emulsion is circulated from the tank to the flow distributor over the flat, inclined plate and back into the tank by the magnetic pump. Other forms of closed-loop, thin-film reactor configurations can also be used.

These and other features of the present invention will become readily apparent upon further review of the following specification and drawings.

BRIEF DESCRIPTION OF DRAWINGS

Similar reference characters denote corresponding features consistently throughout the attached drawings.

BEST MODES FOR CARRYING OUT THE INVENTION

The method for low temperature microencapsulation of phase change materials is a process for obtaining phase change material (PCM) microcapsules by means of free radical ultraviolet (UV) photo-polymerization using a falling thin film closed loop UV reactor or any enclosed quartz reactor. A PCM emulsion is typically cloudy, and therefore not transparent to UV light. Thus, a falling thin film closed loop UV reactor was designed and constructed to increase the UV light penetration through the emulsion thereby increasing the photo polymerization reaction rate. Although an inclined glass plate is described herein, it should be understood that it is possible to use any enclosed thin-film Quartz reactor instead of the inclined glass plate.

Microencapsulation is a process of engulfing the materials of solids or droplets of liquids or gases in a compatible thin solid wall. The material inside the capsules is referred to as the core, internal phase, or fill, whereas the wall is sometimes called a shell, coating, or membrane.

The method for low temperature microencapsulation of phase change materials comprises the following steps: (a) preparing a phase change emulsion including droplets of at least one active phase-change material in water with a surfactant; (b) adding a monomer of at least one encapsulating agent; (c) introducing the phase change emulsion into a UV reactor while stirring the emulsion; and (d) initiating the photo polymerization of monomers using at least one UV lamp inside the UV reactor for photo polymerization until the phase change material is encapsulated within a polymeric shell to form microcapsules.

The process of microencapsulation of phase-change material based on free radical polymerization by UV light can further comprise washing the microcapsules to remove any unreacted monomer and any phase-change material. The process of microencapsulation of phase-change material based on free radical polymerization by UV light can further comprise drying the microcapsules in an oven at about 50° C. for about 48 hours.

The emulsion typically is a thin film, and the phase change emulsion is kept circulating inside the reactor for at least two hours at 35° C.

The phase change material can be an organic compound, which is selected from the group consisting of paraffin, esters, and fatty acids. This encapsulation process can be applied to similar compounds, even those which are not classified as phase change materials.

The surfactant typically is a nonionic surfactant selected from the group consisting of sodium bis (2-ethylhexyl) sulfosuccinate, cetyltrimethylammonium bromide (CTAB), didodecyldimethylammonium bromide, and Triton-X and Sodium dodecyl sulfate (SDS).

The process of microencapsulation of phase-change material can further include adding at least one cross-linking agent to the monomer, wherein the cross-linking agent is selected from the group consisting of ethylene glycol dimethyacrylate (EGDM), pentaerythritol tetraacrylate (PETRA), and mixtures thereof. The monomer is a monoacrylate, a polyacrylate, or a mixture of mono- and polyacrylates.

The microcapsules obtained by the above process have diameters typically ranging from 0.5 to 2 μm.

Typically, in an exemplary embodiment, the UV polymerization reactor for microencapsulation of phase-change material includes a collection tank surrounded with a cooling jacket, the tank having a mechanical stirrer and a thermocouple, the tank being adapted to receive a phase change material emulsion; a magnetic pump for recirculating the emulsion from the tank to a flow distributor; a plurality of UV lamps for providing UV light for initiation of polymerization, the lamps being positioned above a flat, inclined glass plate or around a thin-film Quartz reactor; a nitrogen supply unit connected to the UV polymerization reactor and supplying a nitrogen to create an inert atmosphere and to deoxygenate the phase change material emulsion; and a cooling unit to cool the collection tank during the polymerization. The phase change material emulsion is circulated from the tank to the flow distributor over the flat, inclined plate and back into the tank by the magnetic pump. Described below is an exemplary method to produce the PCM microcapsules.

Example 1

Closed Loop UV Reactor for Microencapsulation of Phase Change Material

Figure 1:
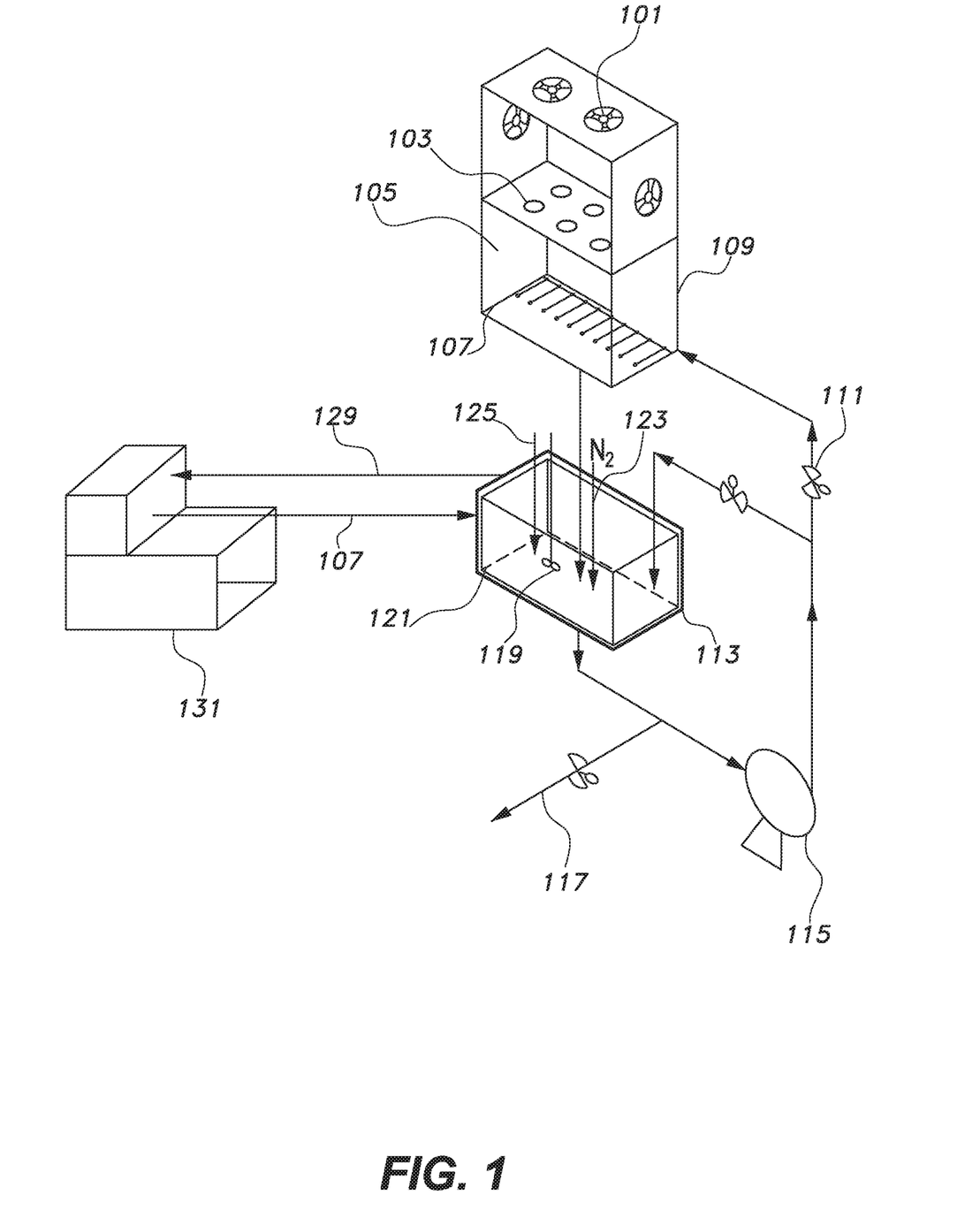
FIG. 1 is a schematic diagram of a falling thin film closed loop UV photo-reactor used in a method for low temperature microencapsulation of phase change materials according to the present invention.

The PCM microcapsules were prepared in a closed loop UV reactor. As shown in FIG. 1, the closed loop UV reactor consists of several parts, including a collection tank 121, a magnetic pump 115, an emulsion flow distributor 109 at the top of the inclined glass plate 103, four UV lamps 101, and a cooling fan and circulating cooling system 131 having a hot water outlet 129 and a cold water inlet 107. In a typical trial, 1.5 L of prepared PCM emulsion was used. The emulsion was introduced at the start of the experiment in the collection tank 121, which was surrounded with a cooling jacket 113 and equipped with a mechanical stirrer 119. The magnetic pump 115 recirculated the emulsion from the tank 121 to the flow distributor 109 at a flow rate of 1.5 L/min. The flow distributor 109 was located at the top of the flat inclined plate 103. The flat inclined plate surface 103 was made from glass, on which the prepared PCMs emulsion flowed as a thin film and back into the tank 121. Four UV lamps 103 (MH module, 250 W mercury lamp, Heraeus Noblelight GmbH) were positioned 300 mm above the surface of the thin film emulsion. The UV reactor was purged with nitrogen 105, as well as a stream of nitrogen 123 in the collection tank 121 during the photo polymerization reaction for deoxygenating the emulsion. The circulating time of PCM emulsions was kept for two hours (except as described below) at about 35° C.

The produced PCM microcapsule suspension was transferred to a clean glass beaker for a washing process. PCM microcapsule suspensions were washed three times with distilled water to remove any unreacted monomer and any PCM that had not been encapsulated. The separated microcapsules were spread on a tray and placed in an oven at 50° C. for 48 hours to dry. The dried microcapsules were then collected for testing.

Example 2

Effect of Emulsion Preparation Method on Microencapsulation of Paraffin RT21

Two methods have been used for preparing PCM emulsions. In the first method (Method '1'), droplets of monomers and PCM mixture are formed in a solution of surfactant and water. The photo polymerization of the prepared emulsion occurs in the core of the droplet, and a polymer shell forms outside of the core. However, in the second method (Method '2'), PCM droplets are formed in the solution of surfactant and water, and then a monomer or mixture of monomers is added. The photo polymerization in Method '2' takes place in two areas: (i) in the micelles of the PCM droplets, where some of the monomers are diffused and located; and (ii) in the aqueous phase. Organic-soluble and water-soluble photo initiators were used in Methods '1' and '2', respectively. The mass ratio of PCM to monomers was kept constant in both methods.

Figure 2A:
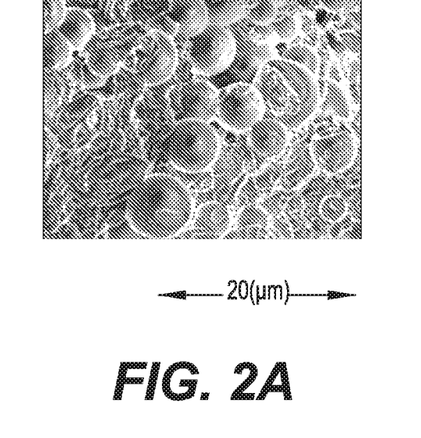
FIG. 2A is a scanning electron micrograph (SEM) of paraffin RT21 microcapsules prepared using Method '1'.
Figure 2B:
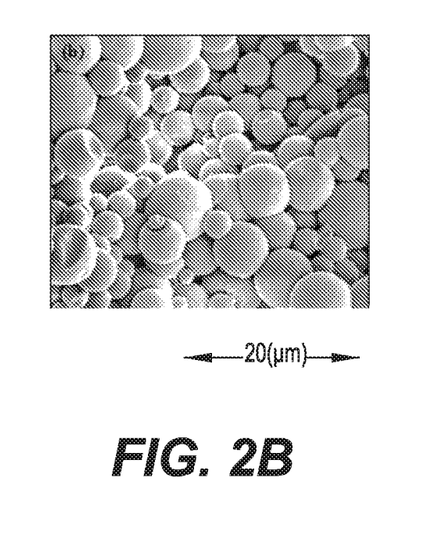
FIG. 2B is a scanning electron micrograph (SEM) of paraffin RT21 microcapsules prepared using Method '2'.

Scanning electron micrograph (SEM) images of RT21 (paraffin) microcapsules prepared using the two different methods of emulsion preparation are shown in FIGS. 2A and 2B. The results in FIG. 2A show that most of the particles are agglomerated into lumps, and that a small amount of microcapsule was obtained when the emulsion was prepared using Method '1'. This could be due to the low monomer conversion. The UV light attacks the mixture of photo initiator and monomers that are concentrated in the droplets micelles and produced a very thin polymer shell. The produced shell is non-transparent, so the shell prevents UV light from going inside the droplet to complete photo polymerization of the rest of the monomer. This very thin polymer shell is not strong enough to contain the PCM inside the capsules, so most of the capsules agglomerated into lumps and PCM leaked out, as shown in FIG. 2A. However smooth, compact and dry spherical capsules were produced when the emulsion was prepared using Method '2', as shown in FIG. 2B.

Figure 3:
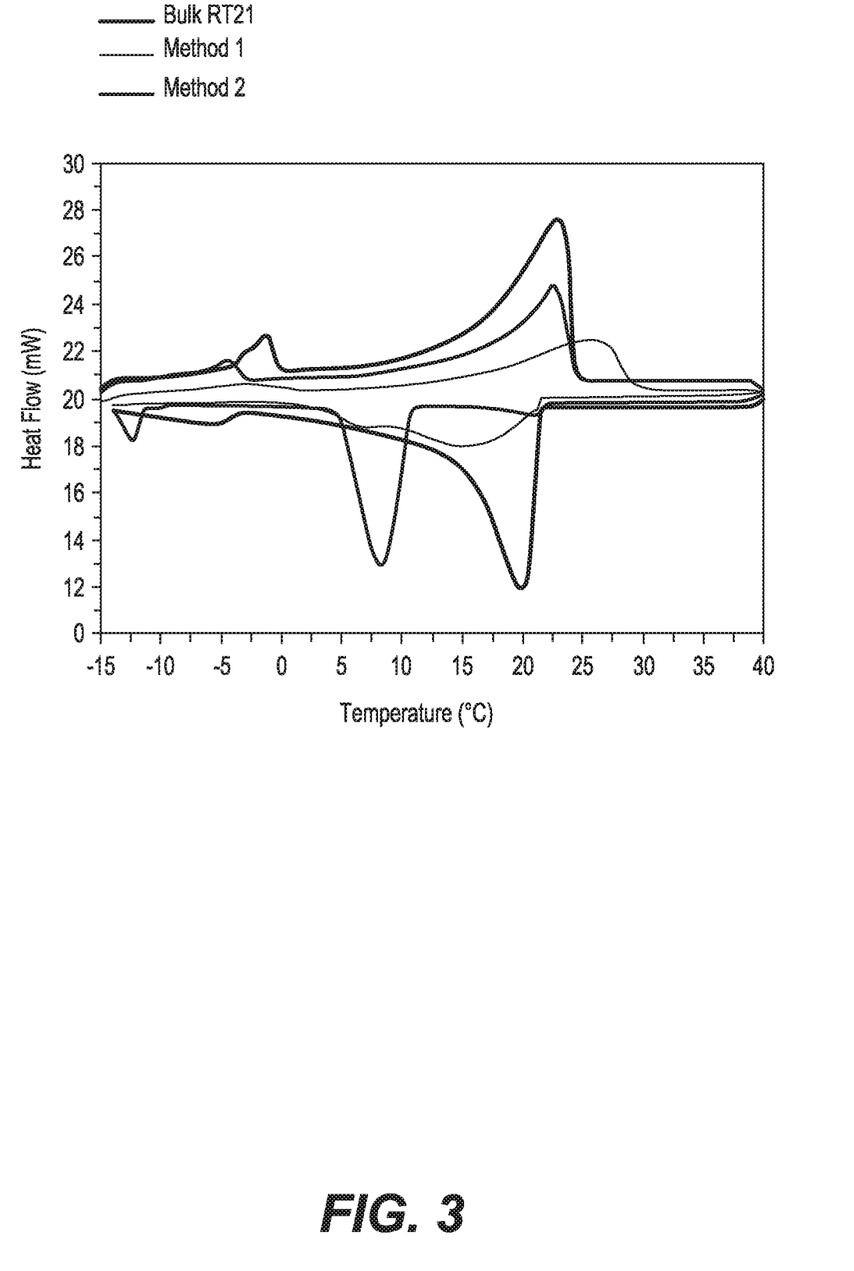
FIG. 3 is a plot comparing differential scanning calorimetry (DSC) curves of RT21 microcapsules prepared using Method '1' and Method '2'.

Phase change properties of bulk PCM and PCM microcapsules were measured using a differential scanning calorimeter (DSC) as shown in FIG. 3. The DSC measurements show that energy storage capacity of the microcapsules produced using Method '2' is significantly higher than those produced using Method '1'.

TABLE 1

Thermal Properties of Paraffin Microcapsules Prepared Using the Two Methods of Emulsion Preparation

|  | Method 1 | | Method 2 | | Bulk RT21 | |
| --- | --- | --- | --- | --- | --- | --- |
|  | Heating | Cooling | Heating | Cooling | Heating | Cooling |
| $T_{onset}$ (° C.) | 15.19 | 21.51 | 16.02 | 10.63 | 15.41 | 21.42 |
| $T_{peak}$ (° C.) | 25.63 | 15.38 | 22.5 | 8.2 | 22.82 | 19.82 |
| $T_{endset}$ (° C.) | 28.90 | 2.4 | 24.48 | 4.9 | 24.24 | 14.58 |
| ΔH (kJ/kg) | 70.6 | 79.5 | 103.6 | 94.3 | 135 | 133.6 |

Although the following discussion is based on encapsulating RT21, which is paraffin, the present method is not limited to paraffin, but can be applied to other PCM, such as esters and fatty acids. The melting temperatures of the RT21 microcapsules increased and became higher than the bulk RT21 when the PCM emulsion was prepared using Method '1'. However, there was no change in the melting temperature of RT21 microcapsules prepared using Method '2', as reported in Table 1 and shown in FIG. 3.

The thermal characteristics (i.e., melting range and latent heat of fusion) of bulk RT21 was tested following an exposure to heating at temperatures of 30° C. and 55° C. The results obtained indicated that RT21 experienced a significant irreversible physical change with time. The data collected and analysis indicated a shift in the peak melting point from 22.5° C. to 28° C. due to loss of low molecular mass paraffin present over a period of 120 days when kept at a temperature of 55° C. The well containment of the RT21 inside the polymer shell produced using Method '2' prevented such loss.

Figure 4A:
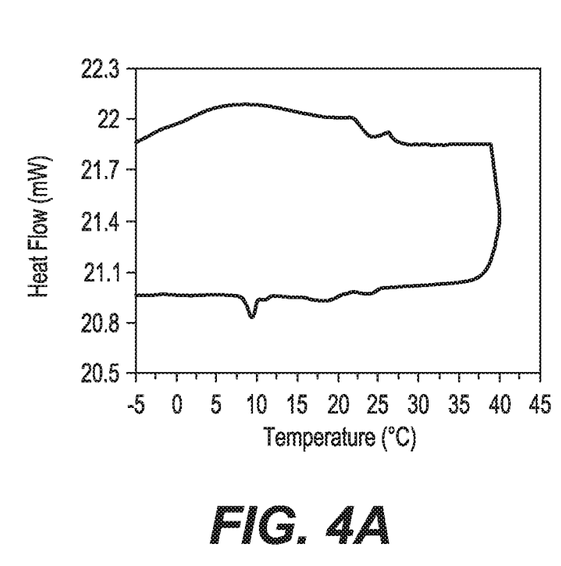
FIG. 4A is a plot showing the DSC curve of pure polymer microspheres (no PCM encapsulated therein) produced as a byproduct of attempting to encapsulate RT21 (paraffin) in microcapsules using Method '2'.
Figure 4B:
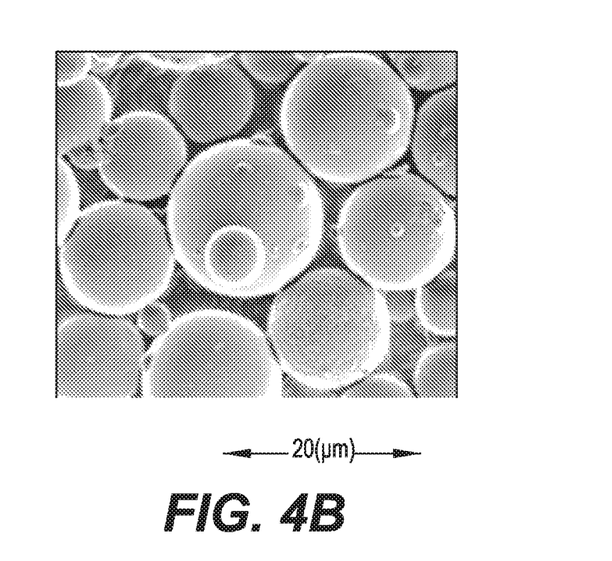
FIG. 4B is a SEM micrograph of the pure polymer microspheres of FIG. 4A.

However, the drawback of Method '2' is the formation solid polymer microspheres (no PCM encapsulated in the microspheres, thus representing a loss of monomers) as observed particles, which precipitated during the process of washing. DSC measurement of these particles shows no peaks within the temperature range of the RT21 phase transition, as shown in FIG. 4A, suggesting that they contain no PCM, as shown in the SEM micrograph of FIG. 4B. Approximately 30-35% of the total monomer was converted to polymer microspheres instead of PCM microcapsules. Further investigation is needed to minimize the monomer loss.

Example 3

Effect of Adding Cross-Linking Agents on the Properties of RT21 Microcapsules

Figure 5A:
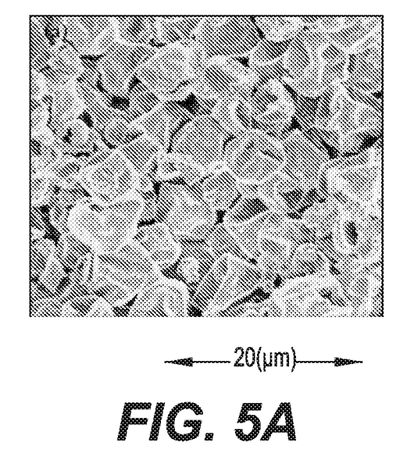
FIG. 5A is a SEM micrograph of RT21 microcapsules produced using EGDM (ethylene glycol dimethyacrylate) as a crosslinker.
Figure 5B:
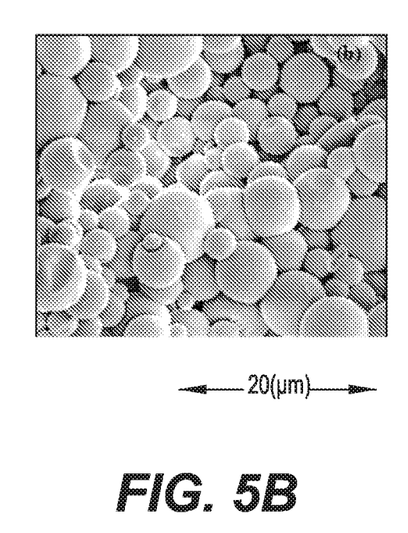
FIG. 5B is a SEM micrograph of RT21 microcapsules produced using PETRA (pentaerythritol) as a crosslinker.

In this study, cross-linking agents with different numbers of cross-linkable functional moieties, such as ethylene glycol dimethyacrylate (EGDM) (two C=C reactive groups) and pentaerythritol tetraacrylate (PETRA) (three C=C reactive groups) were used separately. Unsaturated monomers, which have one C=C group per molecule (monomethacrylate monomer), tend to be mixed with monomers having two or more C=C group per molecule (multiacrylate monomer) to produce a polymer with reasonable properties (such as high mechanical strength). Each multiacrylate monomer was mixed with methyl methacrylate (MMA) and used in the microencapsulation process. FIGS. 5A and 5B show the SEM micrographs of RT21 microcapsules produced at 1:1 mass ratio of each cross linking agent (EGDM in FIG. 5A and PETRA in FIG. 5B) to monomer.

Figure 6:
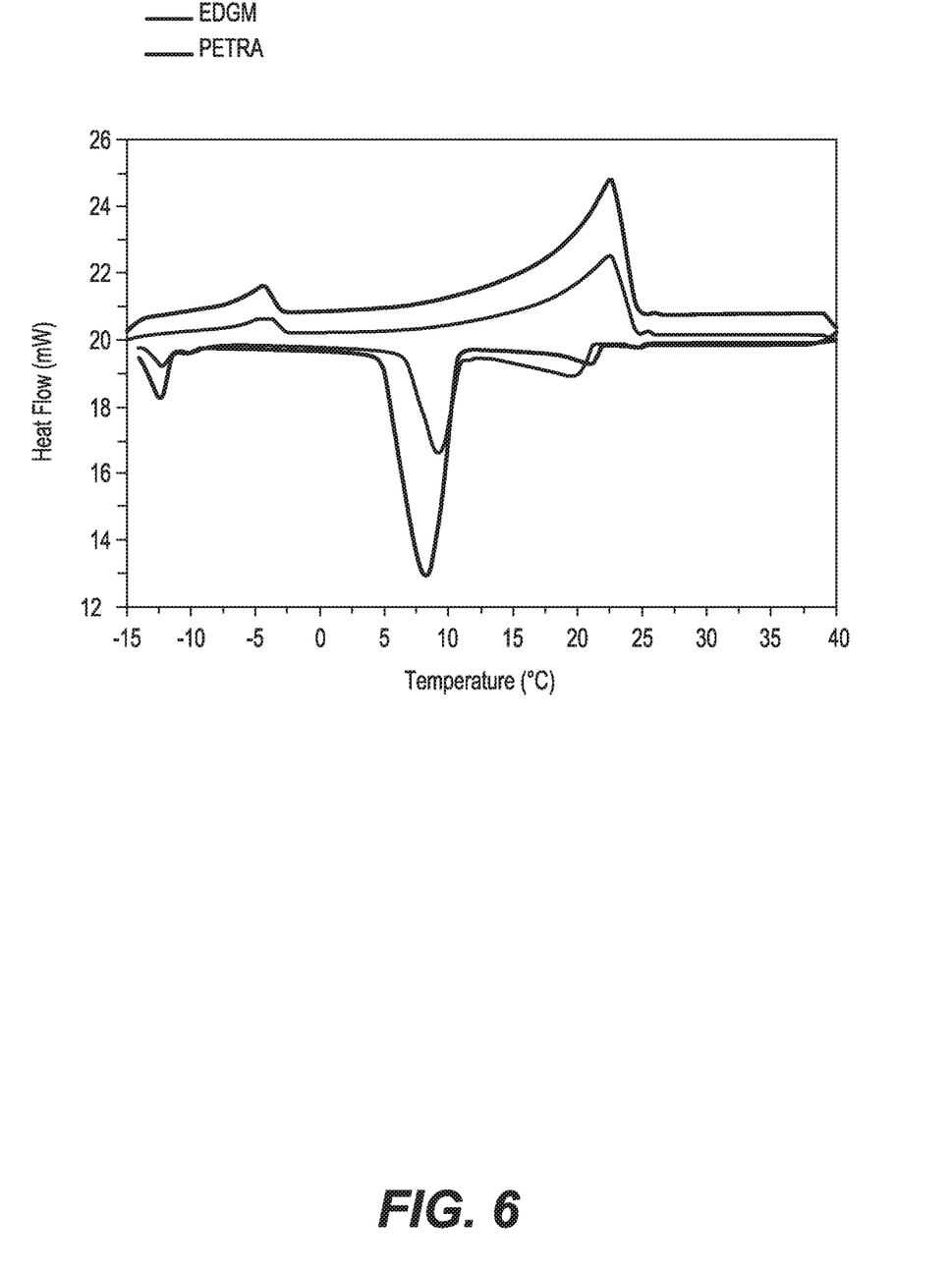
FIG. 6 is a plot comparing the DSC curves of RT21 microcapsules produced using EGDM and PETRA as a crosslinker.

Broken and shrinkage microcapsules were observed when ethylene glycol dimethyacrylate (EGDM) was used, as depicted in FIG. 5A. However, smooth and compact microcapsules with very limited dimples on their surfaces were obtained when (PETRA) was used, as shown in FIG. 5B. This result indicates that the larger the number of crosslinking functional moieties, the higher the degree of cross-linking of the polymer shell of the microcapsules, and thus the stronger shell. Not only does the higher number of crosslinking functional moieties have a positive effect on the microcapsule's morphology, but it also increases the thermal energy storage capacity of the PCM microcapsules from 83.2 to 103.6 J/g, as shown in FIG. 6.

Example 4

Effect of PETRA Concentrations on the RT21 Microcapsules Properties

Figure 7A:
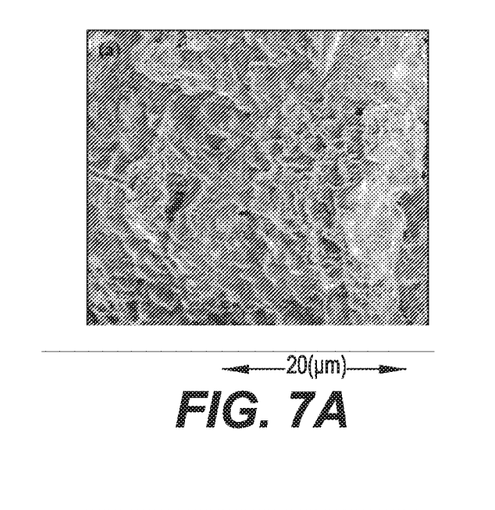
FIGS. 7A, 7B, 7C, and 7D are SEM photographs of RT21 microcapsules using PETRA concentrations of 0 wt %, 15 wt %, 30 wt %, and 50 wt %, respectively.
Figure 7B:
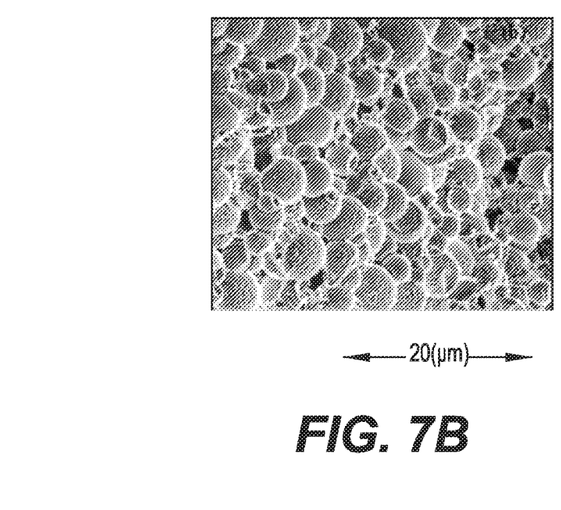
Figure 7C:
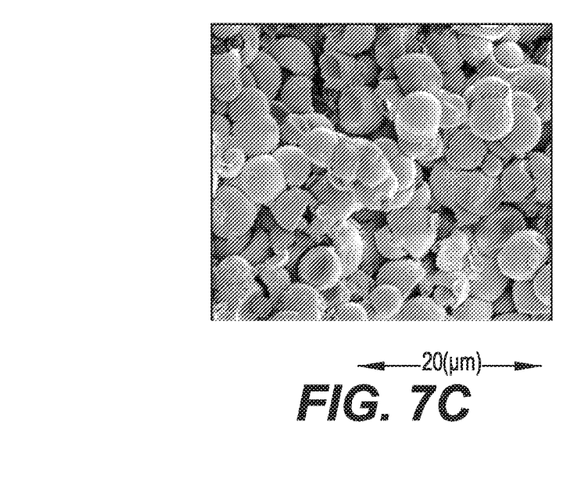
Figure 7D:
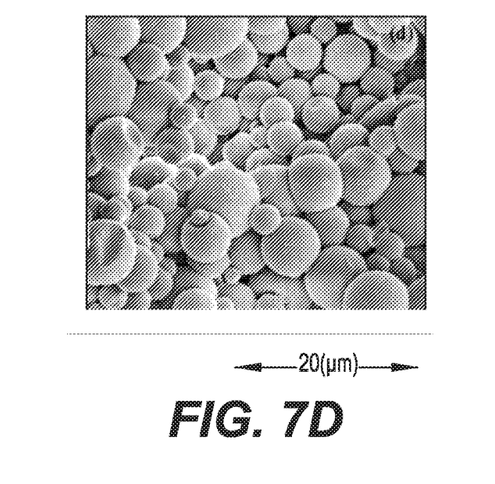

In order to explore the effect of PETRA concentrations on the properties of PCM microcapsules, a series of experiments were carried out using PETRA concentrations from 0 to 50 wt. %. SEM photos of RT21 microcapsules are shown in FIGS. 7A-7D. Particles are agglomerated to lumps and no microcapsules are formed when only MMA was used, as shown in FIG. 7A. However, spherical microcapsules with porous structure appeared when 15 wt. % of pentaerythritol tetraacrylate (PETRA) was used, as shown in FIG. 7B. The surface morphology of the microcapsules was improved by increasing PETRA concentration. Interestingly, helmet shape microcapsules with smooth and dense surface were observed when the amount of PETRA increased up to 30 wt. %, as shown in FIG. 7C. Further increase in PETRA up to 50 wt. % improved the sphericity of the microcapsules to be totally spherical with smooth and compact surface, as shown in FIG. 7D.

Figure 8:
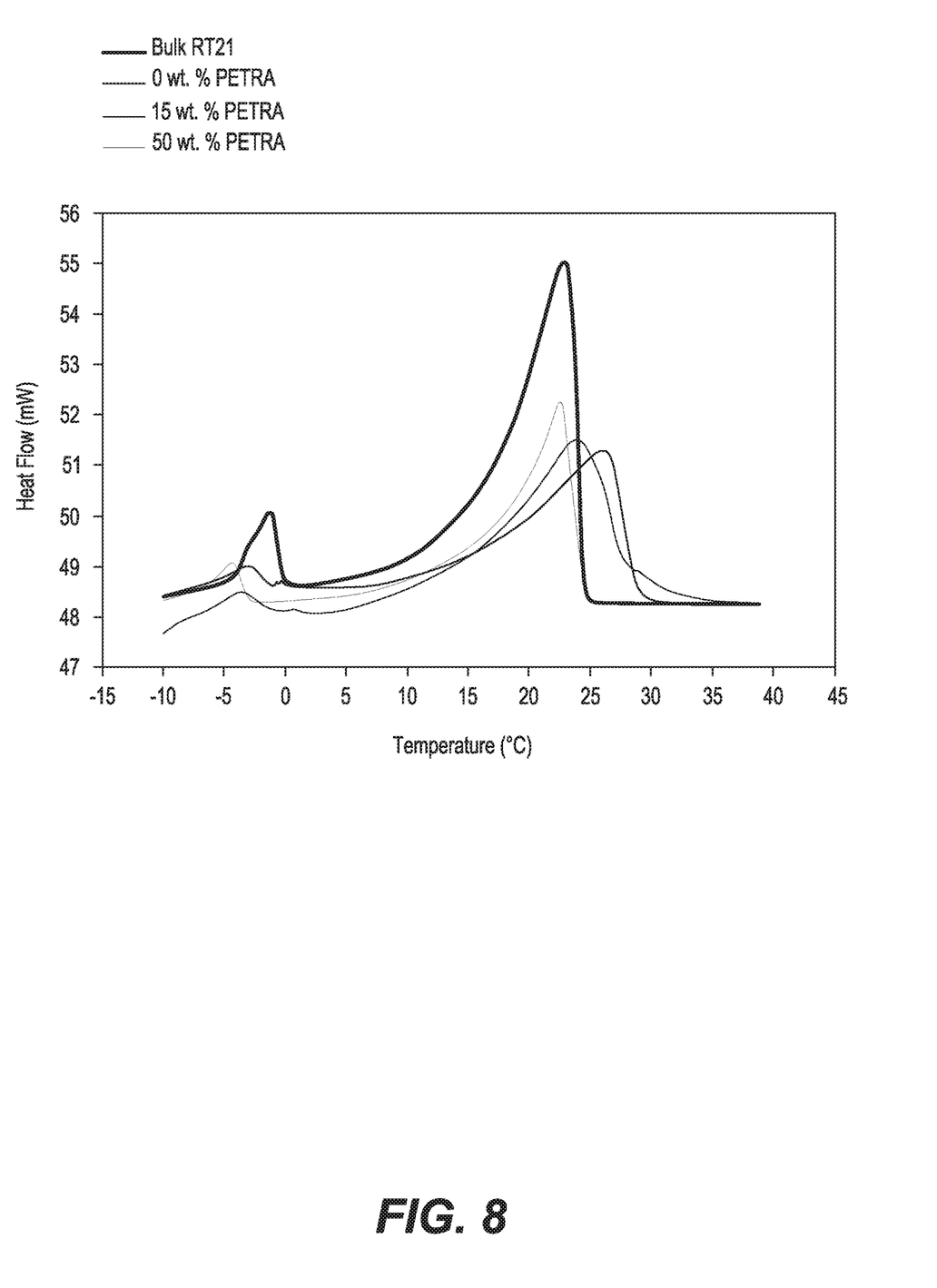
FIG. 8 is a plot comparing the DSC heating curves of RT21 microcapsules prepared with PETRA concentrations of 0 wt %, 15 wt %, 30 wt %, and 50 wt %, respectively.

Thermal properties of the RT21 microcapsules prepared with various PETRA concentrations are shown in FIG. 8 and are summarized in Table 2. It is clear that the endothermic peaks of RT21 microcapsules increased by 3.14 mW and 0.97° C. in comparison to the bulk RT21 when 0 and 15 wt.

% of PETRA were used, respectively. However, no shifting in peak melting temperature of the RT21 microcapsules was observed when 50 wt. % of PETRA was used, as shown in FIG. 8 and Table 2. It is also obvious that increasing PETRA concentration led to an increase in the latent heat of the RT21 microcapsules. RT21 microcapsules prepared using 50 wt. % PETRA had the highest latent heat of fusion (103.6 J/g), which corresponds to 76.7 wt. % PCM (Table 2). These results imply that the higher crosslinking degree increases the strength of the polymer shell, and hence enhanced the containment of RT21 inside the microcapsules, thus preventing RT21 from vaporizing and leaking.

TABLE 2

Thermal Properties of RT21 Microcapsules with Versus PETRA Concentrations

| | Heating | | | |
|---|---|---|---|---|
| | $T_{onset}$ (° C.) | $T_{peak}$ (° C.) | $T_{endset}$ (° C.) | ΔH (kJ/kg) |
| Bulk RT21 | 15.41 | 22.82 | 24.24 | 135 |
| 0 wt % PETRA | 15.03 | 25.96 | 28.52 | 83.8 |
| 15 wt % PETRA | 14.27 | 23.79 | 28.08 | 89.4 |
| 50 wt % PETRA | 16.02 | 22.5 | 24.48 | 103.6 |

Example 5

Effect of Cross-Linking Agent Mixture Concentrations and Emulsion Circulating Time on RT21 Microcapsule Properties Ethylene glycol dimethyacrylate (EGDM) is a hydrophilic difunctional methacrylate offering low viscosity, low shrinkage, adhesion, flexibility, and high crosslinking density. Incorporation of EGDM into the polymeric shell of the PCM microcapsules improves their thermal and mechanical properties. PETRA is a hydrophilic tetraacrylate monomer, which has four C=C reactive group per molecule, and is commercially used as a light crosslinking and branching agent for co-monomers to prepare crosslinking polymers. Thermal properties and shell mechanical strength of PCM microcapsules were enhanced when PETRA was used. Thus, mixtures of cross-linking agents, EGDM and PETRA, and their effect on the RT21 microcapsules properties were investigated.

Figure 9A:
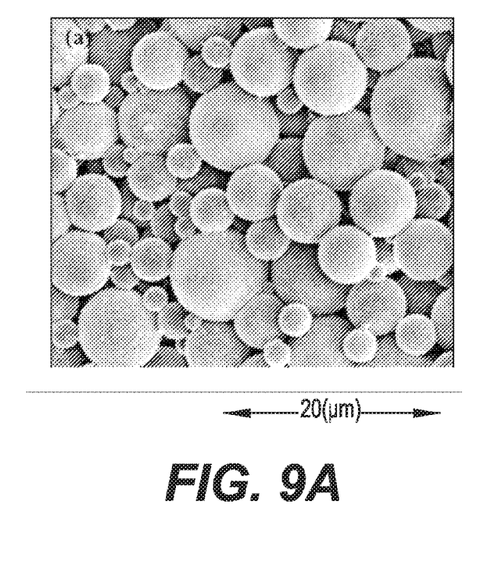
FIG. 9A is a SEM photograph of RT21 microcapsules prepared with a mixture of 35 wt % PETRA and 15 wt % EGDM as cross-linking agents.
Figure 9B:
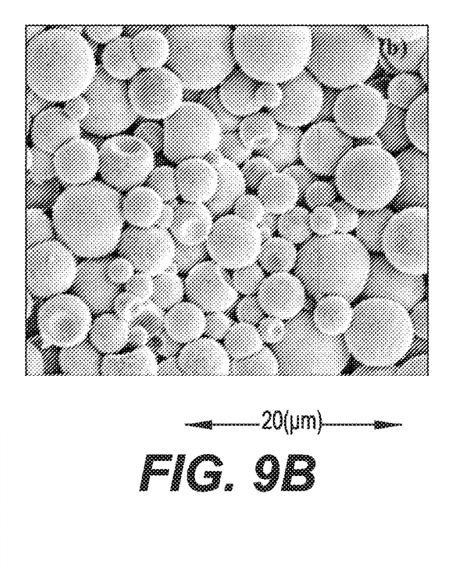
FIG. 9B is a SEM photograph of RT21 microcapsules prepared with a mixture of 15 wt % PETRA and 35 wt % EGDM as cross-linking agents with 2 hours of emulsion circulating time.

FIGS. 9A and 9B show the morphology of RT21 microcapsules prepared with different concentrations of a mixture of EGDM and PETRA. The RT21 microcapsules surface morphology was enhanced when a mixture of 35 wt. % PETRA and 15 wt. % EGDM (mixture 'A') was used, as shown in FIG. 9A. However, buckles and dimples were observed when a mixture of 15 wt. % PETRA and 35 wt. % EGDM (mixture 'B') was used, as shown in FIG. 9B. The absence of RT21 microcapsules dimples when mixture 'A' was used could be due to the enhancement of the mechanical strength of the polymer shell, thus preventing shrinking of the polymer shell during phase transition of the PCM, which experiences a volume change. The thermal energy storage capacity of RT21 microcapsules was higher for mixture 'A', as reported in Table 3. The thicker shell in the case of mixture 'B' decreased the thermal energy storage capacity. Furthermore, mixture 'B' shows less monomer loss in comparison to mixture 'A'. Hence, the product yield when mixture 'B' is used is higher than that of mixture 'A'. It seems that EGDM prefers to diffuse and polymerize on the PCM droplets interface, rather than in the bulk.

TABLE 3

Thermal Properties of RT21 Microcapsules Prepared with Different Mixture Concentrations of Cross-Linking Agents and Emulsion Circulating Time

| | Mixture A[a] | | Mixture B[b] | | Mixture B-1[c] | |
|---|---|---|---|---|---|---|
| | Heating | Cooling | Heating | Cooling | Heating | Cooling |
| $T_{onset}$ (° C.) | 17.46 | 10.62 | 16.85 | 10.55 | 16.74 | 10.62 |
| $T_{peak}$ (° C.) | 22.04 | 7.81 | 22.17 | 7.79 | 22.12 | 8.38 |
| $T_{endset}$ (° C.) | 23.52 | 5.75 | 24.12 | 4.73 | 24.31 | 4.35 |
| ΔH (kJ/kg) | 94.6 | 94.6 | 80.5 | 80.7 | 90.3 | 90.5 |

Figure 9C:
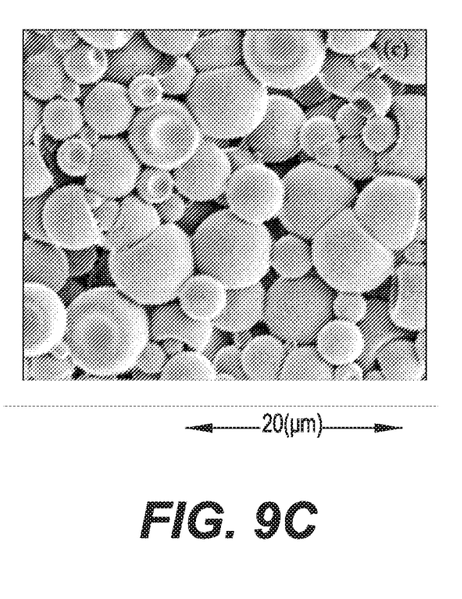
FIG. 9C is a SEM photograph of RT21 microcapsules prepared with a mixture of 15 wt % PETRA and 35 wt % EGDM as cross-linking agents with 1 hour of emulsion circulating time.

[a]Mixture 'A': 35 wt. % PETRA and 15 wt. % EGDM- irradiated time 2 hours
[b]Mixture 'B': 15 wt. % PETRA and 35 wt. % EGDM- irradiated time 2 hours
[c]Mixture 'B-1': 15 wt. % PETRA and 35 wt. % EGDM- irradiated time 1 hour No serious change in the surface morphology of the RT21 microcapsules was observed when the irradiated time was reduced from 2 hours to 1 hour, as shown by comparing FIG. 9B with FIG. 9C. In fact, the heat storage capacity of the RT21 microcapsules increased from 80.5 to 90.3 J/g when the irradiated time decreased from 2 hours to 1 hour, as shown in Table 3. This could be due to less conversion of the monomers, thus producing thinner shell capsules, and hence higher heat storage capacity.

Cross-linked poly (methyl methacrylate) microcapsules containing commercial PCMs are successfully prepared using a novel falling thin film closed loop UV reactor. PCM microcapsule properties depend mainly on the method used for preparing the emulsion. Smooth, compact and dry spherical microcapsules with reasonable heat storage capacity were prepared when a mixture of monomers was used (Method '2'). Particles are agglomerated to lumps and no microcapsules obtained when only methyl methacrylate (MMA) was used. However, the morphology of the PCM microcapsules improved dramatically when cross linking agent (PETRA) was used. The morphology of the microcapsules was similar when the irradiated time reduced from 2 hours to 1 hour, but with an associated significant increase in thermal energy storage of the PCMs microcapsules.

PCM microcapsules have many applications. They are commonly used to improve thermal performance of buildings, for example by use in walls, ceilings or flooring. Other applications include thermal protection, cooling (such as food storage coolers), air conditioning, and for solar heating systems. For example, some applications, such as refrigeration, require encapsulation of low melting temperature PCMs. Encapsulating low melting temperature PCMs at elevated temperatures is difficult, owing to their evaporation. However, the PCMs described herein solve the problem by encapsulating these low melting temperature PCMs at room temperature using closed loop UV reactor technology.

It is to be understood that the present invention is not limited to the embodiments described above, but encompasses any and all embodiments within the scope of the following claims.

The invention claimed is:
1. A method for microencapsulation of phase change materials, comprising the steps of:
(a) adding a phase change material (PCM) and a surfactant to water to form an emulsion including droplets of PCM suspended in the water;
(b) adding a monomer of at least one encapsulating agent to the emulsion;

(c) irradiating a thin film of the emulsion with ultraviolet (UV) radiation on a sloping support above a tank in a UV reactor to initiate polymerization of the at least one encapsulating agent; and (d) continuously recirculating the emulsion from the tank to the sloping support in a thin film while irradiating the thin film emulsion with UV radiation for a period of time of at least two hours sufficient to microencapsulate micron-sized particles of the PCM in a polymer shell.

2. The method for microencapsulation of phase change materials according to claim 1, further comprising the step of washing the microcapsules to remove any unreacted monomer and any phase change material.

3. The method for microencapsulation of phase change materials according to claim 2, further comprising the step of drying the microcapsules in an oven at about 50° C. for about 48 hours.

4. The method for microencapsulation of phase change materials according to claim 1, wherein the emulsion is a thin film.

5. The method for microencapsulation of phase change materials according to claim 1, wherein the phase change material is an organic compound.

6. The method for microencapsulation of phase change materials according to claim 1, wherein the phase change material is selected from the group consisting of paraffin, esters, and fatty acids.

7. The method for microencapsulation of phase change materials according to claim 1, wherein the surfactant is a nonionic surfactant selected from the group consisting of sodium bis (2-ethylhexyl) sulfosuccinate, cetyltrimethylammonium bromide (CTAB), didodecyldimethylammonium bromide, and Triton-X and sodium dodecyl sulfate.

8. The method for microencapsulation of phase change materials according to claim 1, further comprising the step of adding a cross-linking agent with the monomer to produce a 1:1 mass ratio of the cross-linking agent to the monomer.

9. The method for microencapsulation of phase change materials according to claim 1, wherein the monomer is methyl methacrylate.

10. The method for microencapsulation of phase change materials according to claim 9, wherein the cross-linking agent comprises at least one cross-linking agent selected from the group consisting of ethylene glycol dimethyacrylate and pentaerythritol tetraacrylate.

11. A microcapsule made by the method according to claim 1.

12. The method for microencapsulation of phase change materials according to claim 1, wherein the period of time is a period that depends on emulsion flow rate and UV power used.

* * * * *